United States Patent [19]
Yamaguchi

[11] Patent Number: 5,625,151
[45] Date of Patent: Apr. 29, 1997

[54] SILICONE OIL-FILLED SEMICONDUCTOR PRESSURE SENSOR

[75] Inventor: Yasuo Yamaguchi, Itami, Japan

[73] Assignee: Mitsubishi Denki Kabushiki Kaisha, Tokyo, Japan

[21] Appl. No.: 456,306

[22] Filed: Jun. 1, 1995

[30] Foreign Application Priority Data

Dec. 27, 1994 [JP] Japan .................... 6-325824

[51] Int. Cl.$^6$ ............ G01L 13/02; G01L 15/00; G01L 7/00
[52] U.S. Cl. ................... 73/716; 73/756
[58] Field of Search ............ 73/716, 717, 718, 73/719, 720, 721, 722, 723, 724, 725, 726, 727, 756

[56] References Cited

U.S. PATENT DOCUMENTS

| | | | |
|---|---|---|---|
| 4,691,575 | 9/1987 | Sonderegger et al. | 73/756 |
| 4,771,639 | 9/1988 | Saigusa et al. | 73/727 |
| 4,809,555 | 3/1989 | Kunz | 73/727 |
| 4,825,685 | 5/1989 | Breimesser | 73/727 |
| 4,993,266 | 2/1991 | Omura et al. | 73/720 |

Primary Examiner—Richard Chilcot
Assistant Examiner—William L. Oen
Attorney, Agent, or Firm—Leydig, Voit & Mayer

[57] ABSTRACT

A semiconductor pressure sensor that can be inexpensively manufactured with a reduced number of assembly steps and without using spacers includes a stem having an upper surface on which are mounted a pedestal and a semiconductor pressure sensor chip of substantially the same area as that of the stem upper surface. The semiconductor pressure sensor chip and the pedestal include aligned lead insertion holes through which leads are inserted. While spacers have been used in the prior art to reduce vacant space in the sensor that is filled with silicone oil, the spacers can be dispensed with in the invention because the semiconductor pressure sensor chip and the pedestal have areas substantially the same as the stem upper surface and serve as spacers.

5 Claims, 4 Drawing Sheets

SILICONE OIL-FILLED SEMICONDUCTOR PRESSURE SENSOR

FIELD OF THE INVENTION

The present invention relates to a semiconductor pressure sensor and more particularly, to a semiconductor pressure sensor for measuring the pressure of a material which is heated to high temperatures, such as combustion gas for in automobile engines.

DESCRIPTION OF THE RELATED ART

FIG. 7 is a side sectional view showing a prior art semiconductor pressure sensor. Referring to FIG. 7, a semiconductor pressure sensor chip 3a for detecting pressure is mounted on a pedestal 5a which is placed on a stem 6. A thin diaphragm 4 is formed in the semiconductor pressure sensor chip 3a by reducing the chip thickness at one part. The detected pressure is converted into an electrical signal by the diaphragm 4. The electrical signal is transmitted by wires 9 to an external circuit (not shown) through leads 7.

A case 8 is bonded to the stem 6 in surrounding relation to the semiconductor pressure sensor chip 3a. Silicone oil 2 hermetically fills a space defined by the case 8 and the stem 6. In order to reduce the amount of the silicone oil 2 spacers 16, each made of a ceramic or insulator, are provided on an upper surface 61 of the stem 6. A through hole 1a in the center of the case 8 is covered by a metallic diaphragm 1 on top of the case 8.

In the prior art semiconductor pressure sensor having the above structure, when measuring the pressure of a material which is heated to high temperatures, such as combustion gas in automobile engines, the metallic diaphragm 1 first receives the pressure in order to alleviate a thermal effect upon the semiconductor pressure sensor chip 3a. The pressure received by the metallic diaphragm 1 is then detected by the semiconductor pressure sensor chip 3a through the silicone oil 2.

In that type of semiconductor pressure sensor, it is important to reduce the amount of the silicone oil 2 to suppress pressure fluctuations caused by thermal expansion of the silicone oil 2. To this end, the spacers 16 are provided in the space surrounding the semiconductor pressure sensor chip 3a so that the amount of the silicone oil 2 to be is reduced.

In the prior art semiconductor pressure sensor described above, since the spacers 16 are mounted on the stem 6 to reduce the amount of the silicone oil 2, the necessity of mounting the spacers 16 increases the number of parts and the number of assembly steps, resulting in a relatively expensive production cost for the semiconductor pressure sensor.

SUMMARY OF THE INVENTION

With a view of solving the problem mentioned above, an object of the present invention is to provide a semiconductor pressure sensor which can be inexpensively manufactured with a reduced number of assembly steps and without using spacers.

To achieve the above object, according to one aspect of the present invention, there is provided a semiconductor pressure sensor comprising a central case having a through hole and a metallic diaphragm disposed at the through hole; a stem bonded to the case with a space defined between the case and the stem; a pedestal on the stem, having a size nearly equal to an upper surface of the stem, and including lead insertion holes through which leads are inserted; a semiconductor pressure sensor chip on the pedestal, having a size nearly equal to the upper surface of the stem, including lead insertion holes through which leads are inserted, and being partly thinned to form a diaphragm; wires connected to the semiconductor pressure sensor chip; leads connected to the wires, inserted through the lead insertion holes, and penetrating the stem; and silicone oil filling the space defined by the case and the stem.

According to another aspect of the present invention, there is provided a semiconductor pressure sensor comprising a case having a central through hole and a metallic diaphragm disposed at the through hole; a stem bonded to the case with a space defined between the case and the stem; a pedestal on the stem; a semiconductor pressure sensor chip on the pedestal and partly thinned to form a diaphragm; wires connected to the semiconductor pressure sensor chip; leads connected to the wires and penetrating the stem; and silicone oil filling the space defined by the case and the stem, the stem having a stem projection in surrounding relation to the semiconductor pressure sensor chip and the pedestal.

According to still another aspect of the present invention, there is provided a semiconductor pressure sensor comprising a case having a central through hole and a metallic diaphragm disposed at the through hole; a semiconductor pressure sensor chip on the pedestal, partly thinned to form a diaphragm, and bonded to the case such that a recessed rear surface of the diaphragm is located opposite the through hole; a thick film substrate bonded by flip-chip mounting to the semiconductor pressure sensor chip; a retainer plate for fixing the thick film substrate to the case; leads connected to the thick film substrate; and silicone oil filling a space defined by the through hole and the semiconductor pressure sensor chip.

DETAILED DESCRIPTION OF PREFERRED EMBODIMENTS

Embodiment 1

Figure 1:
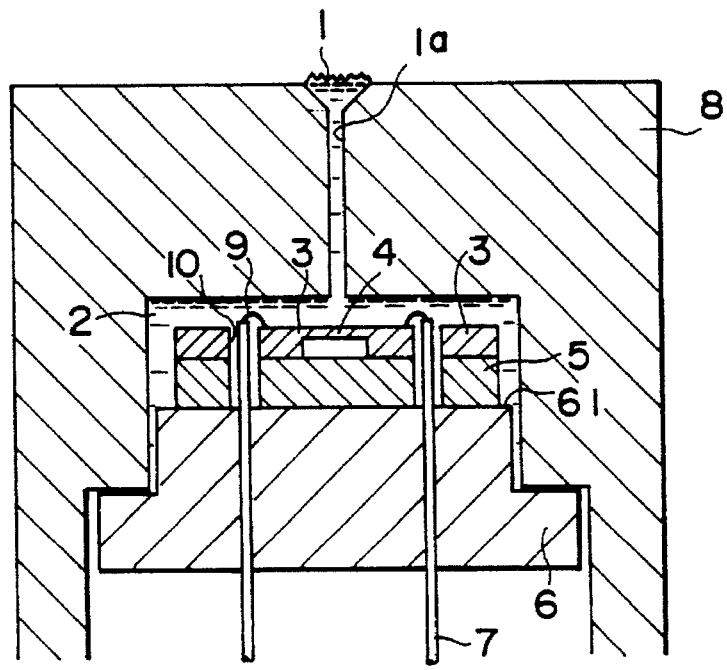
FIG. 1 is a side sectional view showing a semiconductor pressure sensor according to Embodiment 1 of the present invention.
Figure 2A:
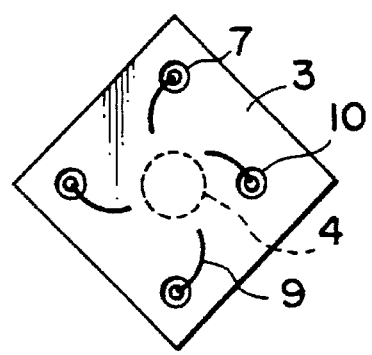
FIGS. 2A and 2B are each a schematic plan view of a principal part of FIG. 1.

FIG. 1 is a side sectional view showing a semiconductor pressure sensor according to Embodiment 1 of the present invention, and FIG. 2A is a schematic plan view of a principal part of FIG. 1. Note that, in the attached drawings, the same reference numerals denote the same of corresponding parts. Referring to FIGS. 1 and 2A, on a stem upper surface 61, there are mounted a pedestal 5 and a semiconductor pressure sensor chip 3 having sizes of substantially on the same order as that of the stem Upper surface 61. The semiconductor pressure sensor chip 3 and the pedestal 5 include respective lead insertion holes 10 through which leads 7 are inserted.

Figure 2B:
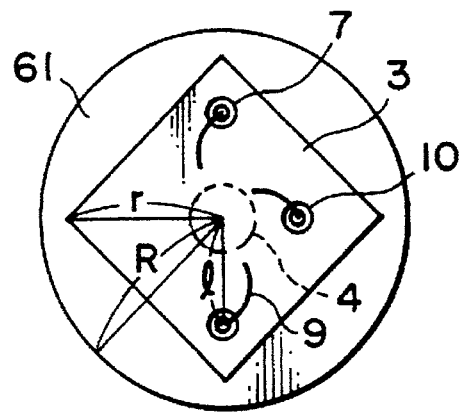

As shown in FIG. 2B, the semiconductor pressure sensor chip 3 and the pedestal 5 are sized as follows. On condition that the radius of the stem upper surface 61 is R, the distance between the center of the stem upper surface 61 and the center of each lead 7 is 1, and the distance between the center of the semiconductor pressure sensor chip and each corner thereof is r, the semiconductor pressure sensor chip 3 and the pedestal 5 are desirably as large as possible within the range in which the relationship of 1<r<R holds.

In the semiconductor pressure sensor of the above structure, when measuring the pressure of a material which is heated to high temperatures, such as combustion gas in automobile engines, a metallic diaphragm 1 first receives the pressure to alleviate a thermal effect upon the semiconductor pressure sensor chip 3. The pressure received by the metallic diaphragm 1 is then detected by the semiconductor pressure sensor chip 3 through silicone oil 2. In this type of semiconductor pressure sensor, it is important, as mentioned before, to reduce the amount of the silicone oil 2 in order to suppress pressure fluctuations caused by thermal expansion of the silicone oil 2. To this end, spacers have been used in the prior art. By contrast, such spacers are not needed in this Embodiment 1 because the semiconductor pressure sensor chip 3 and the pedestal 5 have areas substantially on the same order as that of the stem upper surface 61 and serve as spacers in. Thus, the absence of any need of mounting the spacers reduces the number of parts and the number of assembly steps, and the semiconductor pressure sensor can be manufactured inexpensively.

Embodiment 2

Figure 3:
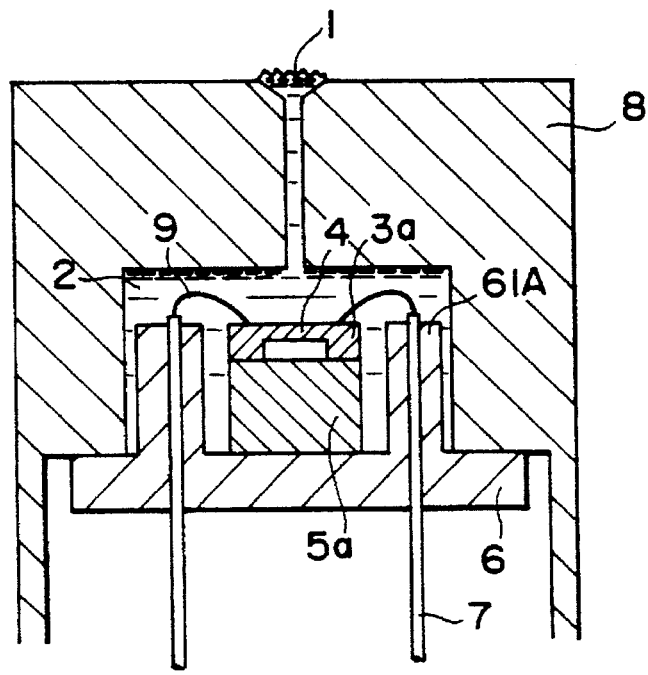
FIG. 3 is a side sectional view showing a semiconductor pressure sensor according to Embodiment 2 of the present invention.
Figure 4:
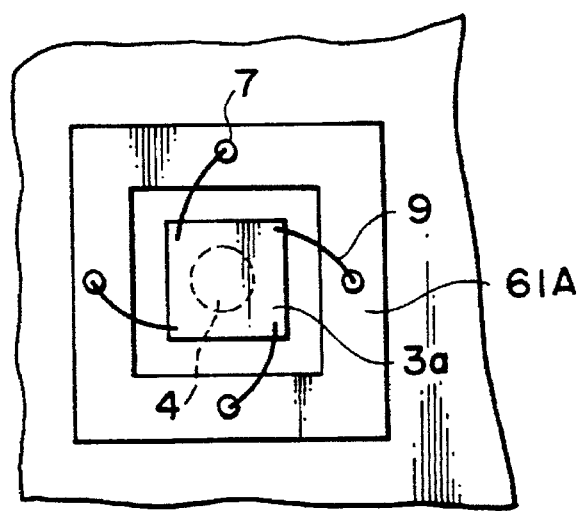
FIG. 4 is a schematic plan view of a principal part of FIG. 3.

FIG. 3 is a side sectional view showing a semiconductor pressure sensor according to Embodiment 2 of the present invention, and FIG. 4 is a schematic plan view of a principal part of FIG. 3. Referring to FIGS. 3 and 4, a semiconductor pressure sensor chip 3a and a pedestal 5a are surrounded by a stem projection 61A projecting from the stem and upper surface 61. The stem projection 61A can be easily formed by, for example, pressing the stem 6 in a recessed mold.

In this Embodiment 2, the amount of the silicone oil 2 can be reduced because of the presence of the stem projection 61A, and hence the spacers which have been needed in the prior art can be dispensed with.

Embodiment 3

Figure 5:
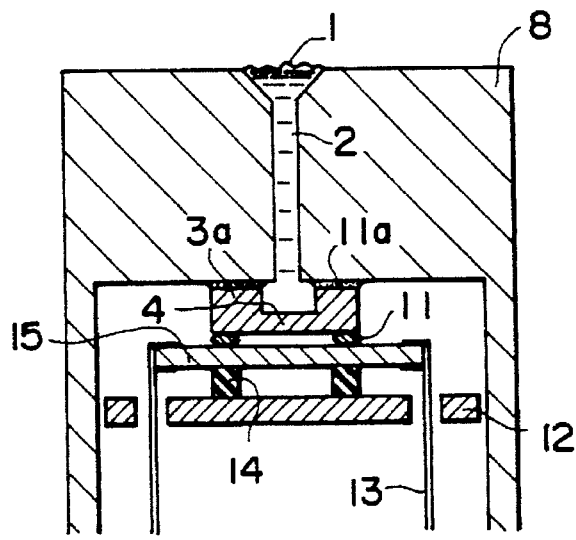
FIG. 5 is a side sectional view showing a semiconductor pressure sensor according to Embodiment 3 of the present invention.

FIG. 5 is a side sectional view showing a semiconductor pressure sensor according to Embodiment 3 of the present invention. Referring to FIG. 5, a semiconductor pressure sensor chip 3a is bonded by flip-chip mounting to a thick film substrate 15, and a rear surface of the semiconductor pressure sensor chip 3a is bonded to the case 8 by an adhesive 11a so that the silicone oil 2 is received in a recess in the rear surface of the semiconductor pressure sensor chip 3a defining a thin diaphragm 4. The thick substrate 15 is fixed to a retainer plate 12 through a rectangular ring 14 for damping the applied force.

In the semiconductor pressure sensor of this Embodiment 3, since the pressure of the silicone oil 2 is directly received by the diaphragm 4 of the semiconductor pressure sensor chip 3a, the amount of the silicone oil 2 can be significantly reduced and the detection accuracy can be improved correspondingly. Reliability of the semiconductor pressure sensor against vibrations can also be improved.

Embodiment 4

Figure 6:
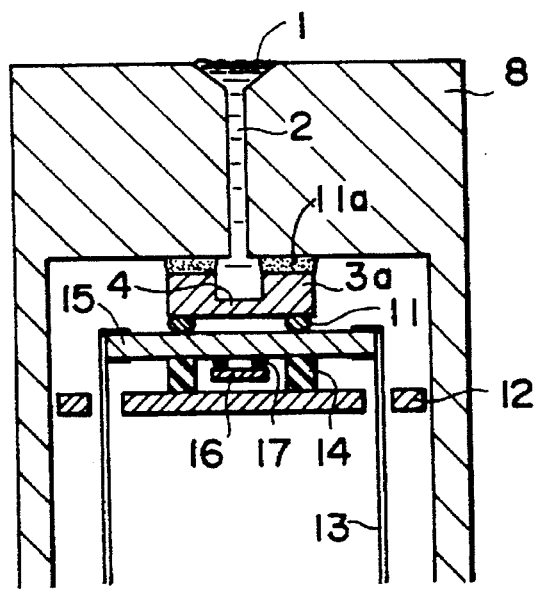
FIG. 6 is a side sectional view showing a semiconductor pressure sensor according to Embodiment 4 of the present invention.
Figure 7:
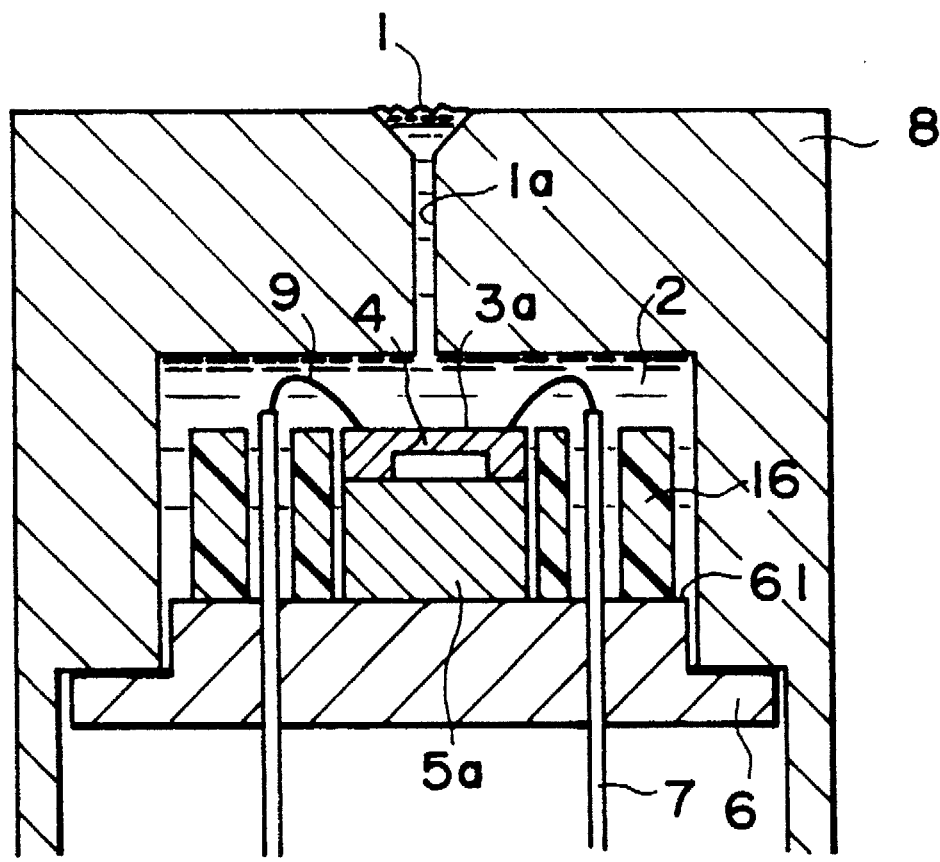
FIG. 7 is a side sectional view showing a prior art semiconductor pressure sensor.

FIG. 6 is a side sectional view showing a semiconductor pressure sensor according to Embodiment 4 of the present invention. In the semiconductor pressure sensor of this Embodiment 4, an IC chip 16 having functions of amplification and temperature compensation is mounted through bumps 17 to a rear surface of the thick film substrate 15 in the semiconductor pressure sensor according of Embodiment 3 opposite the semiconductor pressure sensor chip 3a.

Heretofore, such an IC chip has been provided separately from the semiconductor pressure sensor and electrically connected to the sensor by wires. By contrast, in the semiconductor pressure sensor of Embodiment 4, since the IC chip 16 is mounted through the bumps 17 without using wires, it can be installed in unitary structure with the semiconductor pressure sensor, and hence the entire size of the semiconductor pressure sensor can be reduced. Reliability of the semiconductor pressure sensor against vibrations can also be improved.

What is claimed is:

1. A semiconductor pressure sensor comprising:

a case having a central through hole and a metallic diaphragm covering the through hole;

a stem bonded to said case and defining a space between said case and said stem, said stem having an upper surface within and opposite said case and having an area;

a pedestal mounted on the upper surface of said stem, having an area nearly equal to the area of the upper surface of said stem and including lead insertion holes;

a semiconductor pressure sensor chip mounted on said pedestal, having an area nearly equal to the area of the upper surface of said stem, and including lead insertion holes aligned with the lead insertion holes in said pedestal, said semiconductor pressure sensor chip including a thin diaphragm;

leads extending through the lead insertion holes in said pedestal and said semiconductor pressure sensor chip and penetrating through said stem outwardly from said sensor;

wires connected to said semiconductor pressure sensor chip and to said leads; and silicone oil filling the space between said case and said stem.

2. A semiconductor pressure sensor comprising:

a case having a central through hole and a metallic diaphragm covering the through hole;

a unitary stem bonded to said case and defining a space between said case and said stem, said stem having an upper surface within and opposite said case, an area, and an annular projection projecting from the upper surface within said case;

a pedestal mounted on the upper surface of said stem and surrounded by said protection;

a semiconductor pressure sensor chip mounted on said pedestal, surrounded by said projection, and having a thin diaphragm;

wires connected to said semiconductor pressure sensor chip;

leads connected to said wires and penetrating through said stem outwardly from said sensor; and silicone oil filling the space between said case and said stem.

3. A semiconductor pressure sensor comprising:

a case having a central through hole and a metallic diaphragm covering the through hole;

a semiconductor pressure sensor chip, having a thin diaphragm, and bonded to said case such that said diaphragm is located opposite the central through hole;

a thick film substrate bonded with bump electrodes to a front surface of said semiconductor pressure sensor chip;

a retainer plate mounted to said thick film substrate and mounting said thick film substrate to said case;

leads connected to said thick film substrate; and silicone oil filling the through hole and a space in said case between the through hole and said semiconductor pressure sensor chip.

4. The semiconductor pressure sensor according to claim 3 including an IC chip for amplification and temperature compensation mounted with bump electrodes to said thick film substrate.

5. The semiconductor pressure sensor according to claim 2 wherein said leads penetrate through and extend from said projection within said case.

* * * * *

UNITED STATES PATENT AND TRADEMARK OFFICE
CERTIFICATE OF CORRECTION

PATENT NO.   :   5,625,151
DATED        :   April 29, 1997
INVENTOR(S)  :   Yamaguchi It is certified that error appears in the above-identified patent and that said Letters Patent is hereby corrected as shown below:

Column 4, Line 51, change "protection" to

--projection--;

Signed and Sealed this

Seventh Day of October, 1997

Attest:

BRUCE LEHMAN

*Attesting Officer*   *Commissioner of Patents and Trademarks*